US012560763B2

(12) United States Patent
Bedell et al.

(10) Patent No.: US 12,560,763 B2
(45) Date of Patent: Feb. 24, 2026

(54) EMBEDDED SiGe OPTICAL WAVEGUIDE WITH LOW DEFECTIVITY

(71) Applicant: International Business Machines Corporation, Armonk, NY (US)

(72) Inventors: Stephen W. Bedell, Wappingers Falls, NY (US); Jason S. Orcutt, Katonah, NY (US); Abram L Falk, Port Cheste, NY (US); Chi Xiong, Yorktown Heights, NY (US); Cihan Kurter, White Plains, NY (US); Ashutosh Rao, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 272 days.

(21) Appl. No.: 18/476,470

(22) Filed: Sep. 28, 2023

(65) Prior Publication Data

US 2025/0110276 A1 Apr. 3, 2025

(51) Int. Cl.
*G02B 6/13* (2006.01)
*G02B 6/132* (2006.01)
*G02B 6/136* (2006.01)

(52) U.S. Cl.
CPC ............. *G02B 6/136* (2013.01); *G02B 6/132* (2013.01)

(58) Field of Classification Search
CPC ................................ G02B 6/136; G02B 6/132
USPC .......................................................... 385/14
See application file for complete search history.

(56) References Cited

U.S. PATENT DOCUMENTS

| | | | |
|---|---|---|---|
| 5,682,455 | A | 10/1997 | Kovacic et al. |
| 7,801,406 | B2 | 9/2010 | Pan et al. |
| 7,871,469 | B2 | 1/2011 | Maydan et al. |
| 8,614,143 | B2 | 12/2013 | Kulkarni et al. |
| 8,741,684 | B2 | 6/2014 | Bogaerts et al. |
| 8,824,837 | B2 | 9/2014 | Ren et al. |
| 9,864,138 | B2 | 1/2018 | Coolbaugh et al. |
| 11,113,443 | B1 | 9/2021 | Chang et al. |
| 2003/0015770 | A1 | 1/2003 | Talin et al. |

(Continued)

FOREIGN PATENT DOCUMENTS

| | | |
|---|---|---|
| EP | 3192098 A1 | 7/2017 |
| WO | 2016/039968 A1 | 3/2016 |
| WO | 2021037711 A1 | 4/2021 |

OTHER PUBLICATIONS

SOREF, "Optical band gap of the ternary semiconductor Si1-x-y Ge x C y," Journal of Applied Physics 70, 2470 (1991); doi: 10.1063/1.349403.

*Primary Examiner* — Jerry M Blevins
(74) *Attorney, Agent, or Firm* — Amin, Turocy & Watson, LLP

(57) ABSTRACT

Devices and/or methods of fabrication facilitating suppression of embedded SiGe optical waveguides with low defectivity are provided. In an embodiment, a device can comprise a substrate comprising a trench within the substrate, wherein the trench comprises a base surface and sidewalls comprising the substrate; and a fully strained silicon-germanium (SiGe) structure located within the trench, wherein a bottom surface of the SiGe structure is in contact with the base surface, wherein side surfaces of the SiGe structure are in contact with the sidewalls, and wherein the SiGe structure is at least twice the critical thickness.

20 Claims, 10 Drawing Sheets

(56)                    References Cited

U.S. PATENT DOCUMENTS

| | | | |
|---|---|---|---|
| 2005/0051767 A1* | 3/2005 | Leon | H10F 77/1223 |
| | | | 257/19 |
| 2015/0279973 A1* | 10/2015 | Akarvardar | H10D 30/024 |
| | | | 438/283 |
| 2020/0026003 A1 | 1/2020 | Coolbaugh et al. | |
| 2021/0225927 A1* | 7/2021 | Mun | H10F 39/014 |
| 2022/0181313 A1 | 6/2022 | Gomes et al. | |
| 2023/0056640 A1 | 2/2023 | Sharma et al. | |
| 2023/0069107 A1 | 3/2023 | Wei | |
| 2023/0205094 A1 | 6/2023 | Siers et al. | |

* cited by examiner

104

102

422

424

FORMING, BY A FABRICATION SYSTEM, A TRENCH IN A SUBSTRATE — 902

PERFORMING, BY THE FABRICATION SYSTEM, A DEFECT ELIMINATION PROCESS TO A TRENCH BASE AND SIDEWALLS — 904

PERFORMING, BY THE FABRICATION SYSTEM, AN H2 BAKE ON THE SURFACE OF THE TRENCH — 906

DEPOSITING, BY THE FABRICATION SYSTEM, SiGe WITHIN THE TRENCH — 908

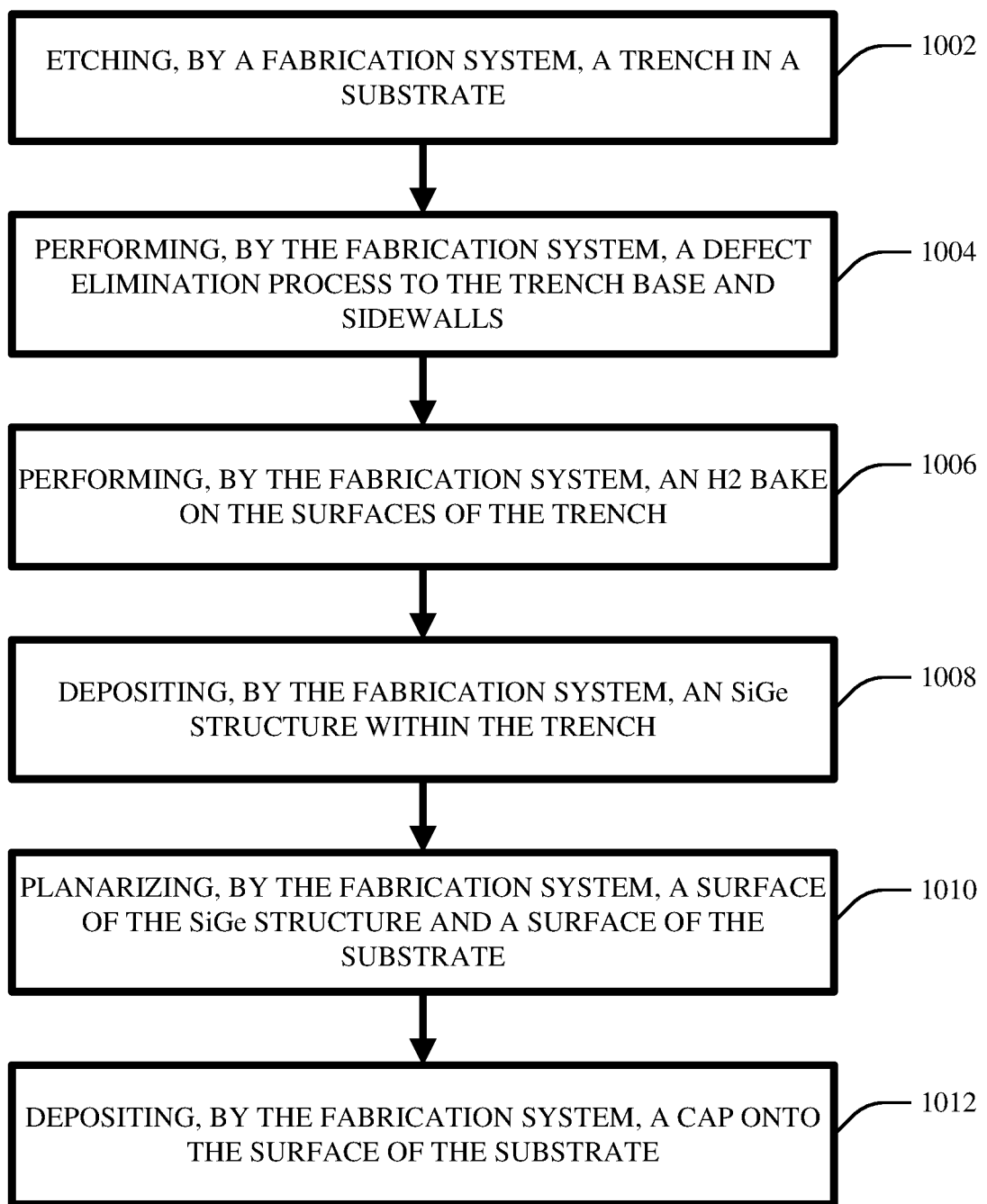

ETCHING, BY A FABRICATION SYSTEM, A TRENCH IN A SUBSTRATE — 1002

PERFORMING, BY THE FABRICATION SYSTEM, A DEFECT ELIMINATION PROCESS TO THE TRENCH BASE AND SIDEWALLS — 1004

PERFORMING, BY THE FABRICATION SYSTEM, AN H2 BAKE ON THE SURFACES OF THE TRENCH — 1006

DEPOSITING, BY THE FABRICATION SYSTEM, AN SiGe STRUCTURE WITHIN THE TRENCH — 1008

PLANARIZING, BY THE FABRICATION SYSTEM, A SURFACE OF THE SiGe STRUCTURE AND A SURFACE OF THE SUBSTRATE — 1010

DEPOSITING, BY THE FABRICATION SYSTEM, A CAP ONTO THE SURFACE OF THE SUBSTRATE — 1012

FIG. 10

EMBEDDED SiGe OPTICAL WAVEGUIDE WITH LOW DEFECTIVITY

BACKGROUND

The subject disclosure relates to SiGe optical waveguides, and more specifically, to embedded SiGe optical waveguides with low defectivity.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, structures and/or methods of fabrication that facilitate embedded SiGe optical waveguides with low defectivity.

According to an embodiment, a device can comprise a substrate comprising a trench within the substrate, wherein the trench comprises a base surface and sidewalls comprising the substrate; and a fully strained silicon-germanium (SiGe) structure located within the trench, wherein a bottom surface of the SiGe structure is in contact with the base surface, wherein side surfaces of the SiGe structure are in contact with the sidewalls, and wherein the SiGe structure is at least twice the critical thickness. An advantage of such a device is that it allows for a waveguide structure with a controlled sidewall profile.

In one or more embodiments of the above-described device, the device can further comprise a capping layer that covers a top surface of the SiGe structure. An advantage of such a structure is that the capping layer can provide structural support to the SiGe structure, preventing deformation and loss of performance of the waveguide.

According to another embodiment, a method for fabricating a device can comprise forming, by a fabrication system, a trench in a substrate; performing, by the fabrication system, a defect elimination process to the trench base and sidewalls; performing, by the fabrication system, an H2 bake on the surfaces of the trench; and depositing, by the fabrication system, SiGe within the trench. An advantage of such a method is that by eliminating defects within the trench, imperfections that can lead to optical loss/scattering can be eliminated, thereby improving waveguide performance.

In one or more embodiments of the above-described method, the method can further comprise depositing, by the fabrication system, a capping layer on the surface of the substrate. An advantage of such a method is that the cap can provide structural support to the SiGe structure, preventing deformation and loss of performance of the waveguide.

According to another embodiment, a method for fabricating a device can comprise etching, by a fabrication system, a trench in a substrate; performing, by the fabrication system, a defect elimination process to the trench base and sidewalls, wherein the defect elimination process comprises a wet etching of the trench and a thermal oxidation and strip process; performing, by the fabrication system, an H2 bake on the surfaces of the trench; depositing, by the fabrication system, an SiGe structure within the trench; planarizing, by the fabrication system, a surface of the SiGe structure and a surface of the substrate; and depositing, by the fabrication system, a cap onto the surface of the substrate.

DESCRIPTION OF THE DRAWINGS

FIG. 10 illustrates a flow diagram of an example, non-limiting method of fabrication of embedded SiGe optical waveguides in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Single crystal SiGe waveguides are desirable for use in microwave-to-optical photon transduction. Formation of such waveguides typically employ two epitaxial growth steps. First growth of strained SiGe and second, growth of a thick (e.g., approximately 5 um) Si cladding layer that surrounds the SiGe. The SiGe must be fully strained yet thicker than the critical thickness. While such films are possible to grow, the growth surfaces must be structurally free of imperfections and contaminants. Currently, SiGe is often grown in blanket layers on Si wafers, patterned into waveguides and then a Si cladding layer is grown on the patterned SiGe devices. The challenge of this approach is that the growth of the thick Si cladding layer imposes a large thermal budget, which leads to SiGe strain loss, as well as unwanted 3D crystal growth around the patterned SiGe devices.

Given the problems described above with fabrication of SiGe waveguides, the present disclosure can be implemented to produce a solution to these problems by fabricating an embedded SiGe waveguide, wherein the fabrication comprises, forming one or more trenches in a substrate; performing a defect elimination process to the trench base and sidewalls, performing an H2 bake on the base and sidewalls; and depositing strained SiGe within the trench. By forming the SiGe within the defect free trench, rather than on a flat wafer as traditionally done, the SiGe structure will comprise smooth defect free side walls, thereby improving waveguide performance. Furthermore, by forming the SiGe within the trench, the growth of Si cladding along the side walls of the SiGe structure is no longer needed, preventing, strain loss of the SiGe as well as stacking fault formation associated with the three-dimensional cladding growth.

FIGS. 1-8 illustrate cross-sections of a device at various stages of fabrication in accordance with one or more embodiments described herein.

Figure 1:
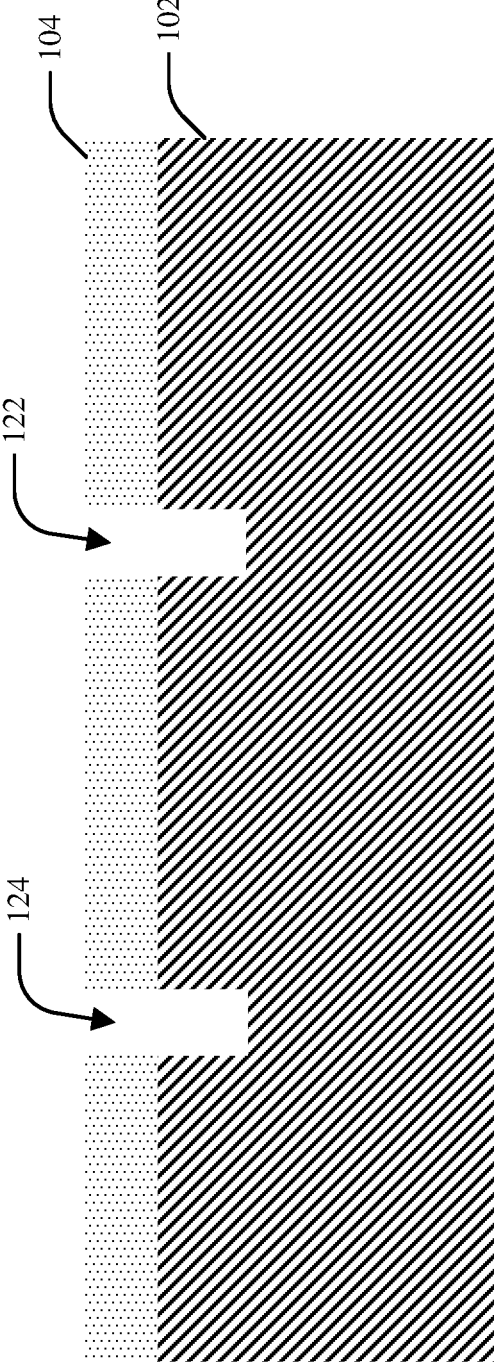
FIG. 1 illustrates a starting substrate for fabrication of a device in accordance with one or more embodiments described herein.

FIG. 1 illustrates a starting substrate for fabrication of a device 100 in accordance with one or more embodiments described herein. As shown, device 100 at this stage comprises a base substrate 102 and an oxide layer 104. In one or more embodiments, base substrate 102 can comprise silicon and oxide layer 104 can comprise an oxide material. As shown, trenches 122 and 124 can be etched through oxide layer 104 and into base substrate 102. In one or more embodiments, an etching process can be utilized to form trenches 122 and 124. Example etching process comprise reactive ion etching (RIE), dry etching, wet etching, ion beam etching, plasma etching, and laser ablation. It should be appreciated that while use of two trenches is illustrated here, the use of any number of trenches is envisioned.

Figure 2:
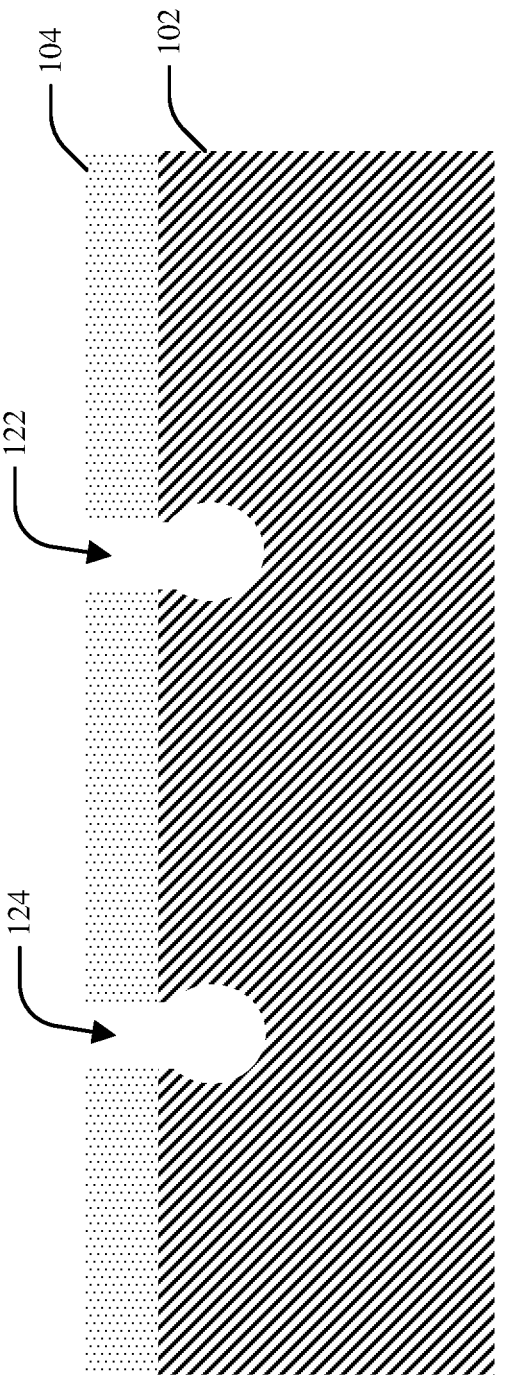
FIG. 2 illustrates a second stage of fabrication of a device in accordance with one or more embodiments described herein.
Figure 3:
FIG. 3 illustrates an alternative second stage of fabrication of a device in accordance with one or more embodiments described herein.
Figure 3:
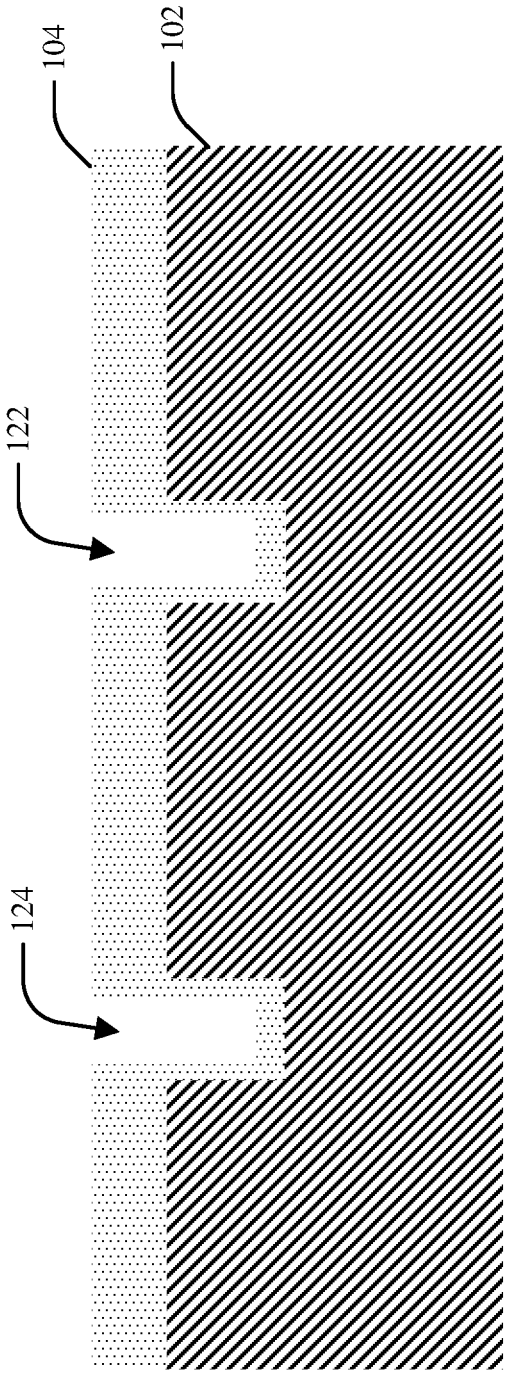

FIG. 2 illustrates a second stage of fabrication of a device 100 in accordance with one or more embodiments described herein. At this stage, a defect elimination process can be utilized to shape the side walls and/or base of trenches 122 and 124. The formation of trenches 122 and 124 can leave behind both defects within the trench sidewalls and base as well as contaminants that can interfere with later SiGe growth. Accordingly, a defect elimination process can be utilized to consume or remove a layer or small portion of the sidewalls and bases of trenches 122 and 124. For example, a second etching process (e.g., such as a wet etching process) can be utilized to consume or remove a small portion of the sidewalls and bases of trenches 122 and 124, which removes defects and flushes contaminants from trenches 122 and 124. Furthermore, the defect elimination process can be utilized to shape trenches 122 and 124 into optimized shapes for use as waveguides. In some embodiments, the defect elimination process can be utilized remove macroscopic defects (e.g., greater than 10 μm) leading to defect free trench bases and sidewalls. In some embodiments, defect free can referrer to a defect density below 1000 defects per cm$^2$ FIG. 3 illustrates an alternative second stage of fabrication of a device in accordance with one or more embodiments described herein. As described above, a defect elimination process can be utilized to remove defects and contaminants left by the formation of trenches 122 and 124. In some embodiments, the defect elimination process can comprise a thermal oxidation process that extends a thin layer of oxide layer 104 onto the sidewalls and bases of trenches 122 and 124. This thin layer of oxide can then be stripped from trenches 122 and 124, thereby removing defects and optimizing the shape of trenches 122 and 124 for formation of SiGe. This defect elimination process is particularly advantageous when trenches 122 and 124 are formed using reactive ion etching (RIE) methods that often leave polymer-based residue that is difficult to remove by other means. It should be appreciated that in one or more embodiments, the defect elimination process can comprise both the second etching process described above in relation to FIG. 2 and the thermal oxidation and strip process described in FIG. 3.

Figure 4:
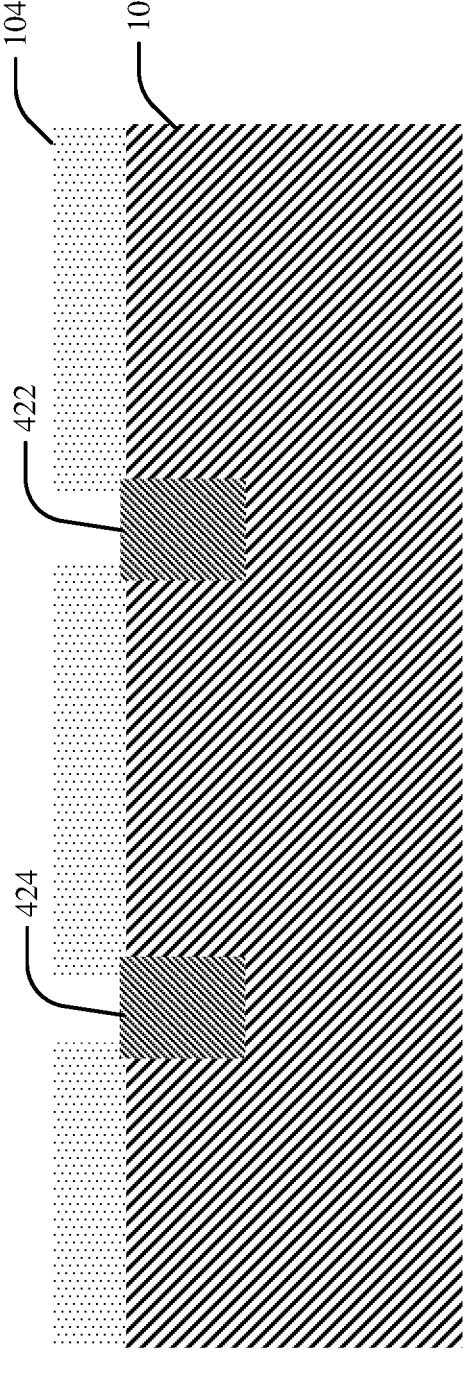
FIG. 4 illustrates a third stage of fabrication of device in accordance with one or more embodiments described herein.

FIG. 4 illustrates a third stage of fabrication of device 100 in accordance with one or more embodiments described herein. At this stage, device 100 can be subjected to a hydrogen bake (e.g., an H2 bake). The H2 bake can comprise a temperature of at least 800° C., at a pressure of between 7 Torr and 50 Torr, for a period of between 1 and 10 minutes. This H2 bake removes any oxygen and moisture that may be embedded on the surface of the side walls and bases of trenches 122 and 124. Further, the bake can cause a reconfiguration of the trench sidewalls and bases at a microscopic level that can eliminate defects on a scale of less than 10 μm, further optimizing the trenches for growth of SiGe. Once the H2 bake is completed, SiGe structures 422 and 424 can be grown within defect free trenches 122 and 124. In one or more embodiments, the deposition of SiGe can comprise the use of Dichlorosilane gas (H$_2$SiCl$_2$), Germanium gas (GeH$_4$), Silane gas (SiH$_4$) Hydrogen Chloride gas (HCl) and/or a Hydrogen carrier gas, and a temperature of between 600 and 900° C. In some embodiments, SiGe structures 422 and 424 can be at least the critical thickness of SiGe and the SiGe structures can be fully strained. In some embodiments, the SiGe structure can further comprise an amount of carbon by including Monomethylsilane gas (CH$_3$SiH$_3$) during growth. In some embodiments, an epitaxial Si capping layer can be grown on the SiGe layer to help prevent the formation of strain-relieving dislocations in the SiGe layer. The thickness of this Si capping layer can be less than 200 nm. This optional Si capping layer also provides a less chemically reactive surface during subsequent processing.

Figure 5:
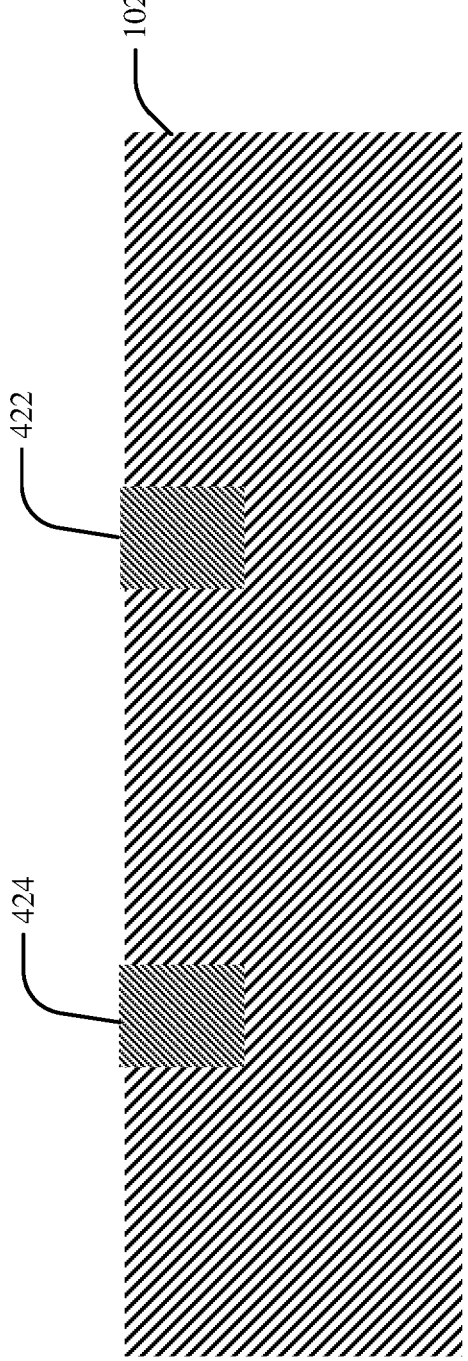
FIG. 5 illustrates a fourth stage of fabrication of device in accordance with one or more embodiments described herein.

FIG. 5 illustrates a fourth stage of fabrication of device 100 in accordance with one or more embodiments described herein. At this stage, oxide layer 104 can be removed from substrates 102. This fourth stage of fabrication creates a predominantly 2-dimensional single-crystal surface for subsequent thick Si cladding layer growth.

Figure 6:
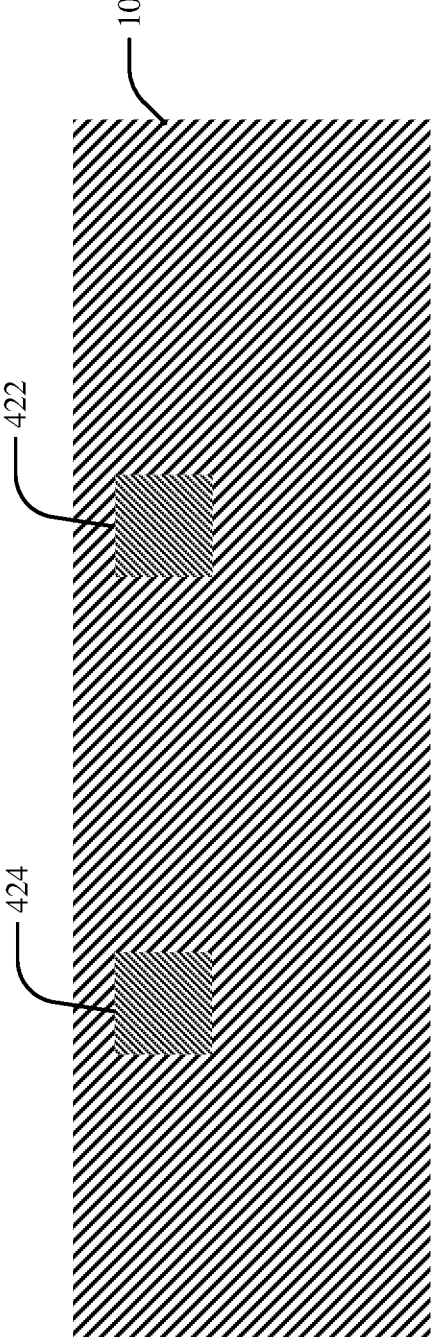
FIG. 6 illustrates a fifth stage of fabrication of device in accordance with one or more embodiments described herein.

FIG. 6 illustrates a final stage of fabrication of device 100 in accordance with one or more embodiments described herein. At this stage, a thick epitaxial layer of Si cladding can be grown to extend substrate 102 overtop of SiGe structures 422 and 424. This Si cladding layer readies the SiGe waveguide and provides confinement of the optical modes in the buried SiGe regions. Furthermore, due to SiGe structures 422 and 424 already being embedded within substrate 102, the thick Si cladding layer is grown on a two-dimensional crystalline surface, thereby preventing the formation of stacking fault defects associated with 3D crystal growth. Additionally, because high crystalline quality 2D Si growth can optionally be performed at lower temperatures using silane gas (SiH$_4$) compared to 3D growth using Dichlorosilane (H$_2$SiCl$_2$), strain relaxation of the SiGe regions can be minimized. The growth of the thick Si cladding layer is typically grown at a temperature between 600° C. and 850° C. to a Si thickness between 3 and 10 microns. As completed, device 100 comprises the substrate 102, the fully strained SiGe structures 422 and 424, wherein the bottom surfaces of the SiGe structures 422 and 424 are in contact with the base surfaces and sidewalls of trenches 122 and 124, and a thick Si cladding layer.

Figure 7:
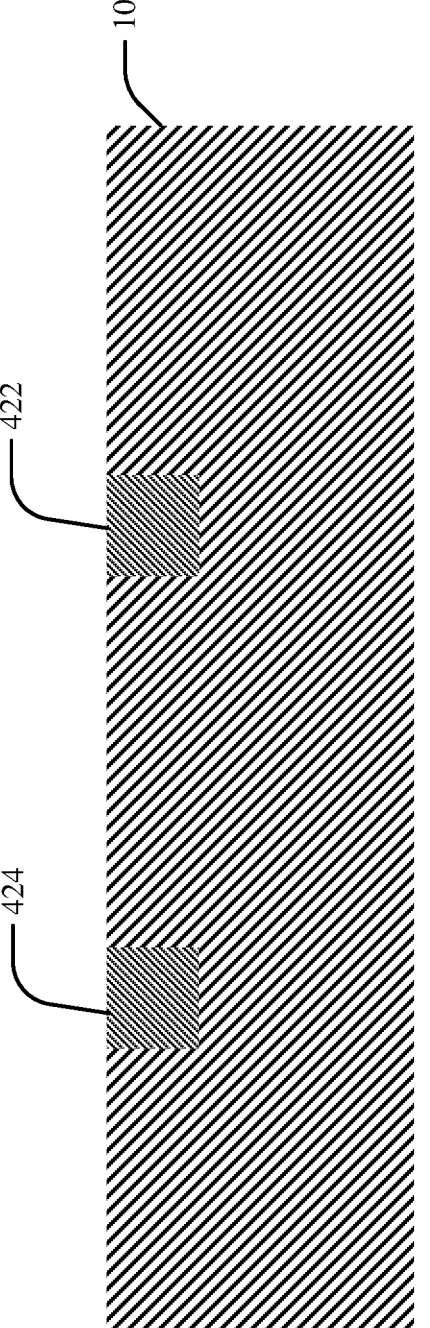
FIG. 7 illustrates an alternative fifth stage of fabrication of device in accordance with one or more embodiments described herein.

FIG. 7 illustrates an alternative fifth stage of fabrication of device 100 in accordance with one or more embodiments described herein. At this stage, a planarization or polishing process can be utilized to improve the optical properties of the top of SiGe structures 422 and 424. Accordingly, the surface of substrate 102 and tops of SiGe structures 422 and 424 can form a planarized surface. For example, as shown, the tops of substrate 102 and SiGe structures 422 and 424 have been polished to be level with one and other. This alternative fifth stage of fabrication would be performed after (or in lieu of) the oxide removal step shown in FIG. 5. The objective is to provide a smooth, coplanar 2D crystalline surface for subsequent thick Si cladding growth. It is also herein contemplated that the tops of the SiGe structures 422 and 424 comprise the optional Si capping layer described in FIG. 4. In this case, after completion of the planarization and polishing steps the entire surface of substrate 102 will be Si thereby simplifying the subsequent growth of the thick Si capping layer.

Figure 8:
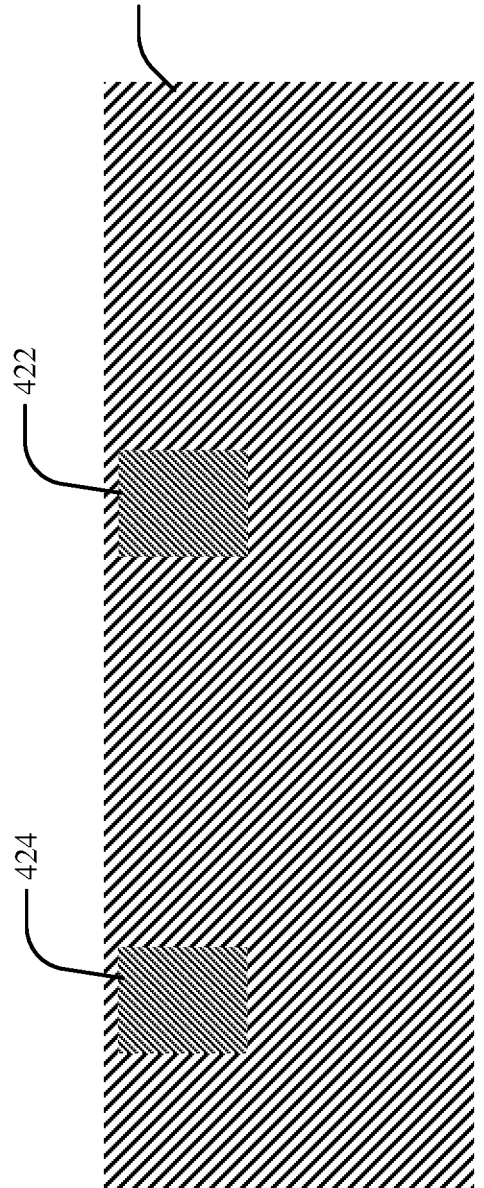
FIG. 8 illustrates a final stage of fabrication of device in accordance with one or more embodiments described herein.

FIG. 8 illustrates a final stage of fabrication of device 100 in accordance with one or more embodiments described herein. At this stage, a thick epitaxial layer of Si can be grown to extend the planarized substrate 102 overtop of SiGe structures 422 and 424. This Si cladding layer readies the SiGe waveguide and provides confinement of the optical modes in the buried SiGe regions. Furthermore, due to SiGe structures 422 and 424 already being embedded within substrate 102, the thick Si cladding layer is grown on a two-dimensional crystalline surface, thereby preventing the formation of stacking fault defects associated with 3D crystal growth. Additionally, because high crystalline quality 2D Si growth can optionally be performed at lower temperatures using silane gas ($SiH_4$) compared to 3D growth using Dichlorosilane ($H_2SiCl_2$), strain relaxation of the SiGe regions can be minimized. The growth of the thick Si cladding layer is typically grown at a temperature between 600° C. and 850° C. to a Si thickness between 3 and 10 microns. As completed, device 100 comprises the substrate 102, the fully strained SiGe structures 422 and 424, wherein the bottom surfaces of the SiGe structures 422 and 424 are in contact with the base surfaces and sidewalls of trenches 122 and 124, and a thick Si cladding layer.

Figure 9:
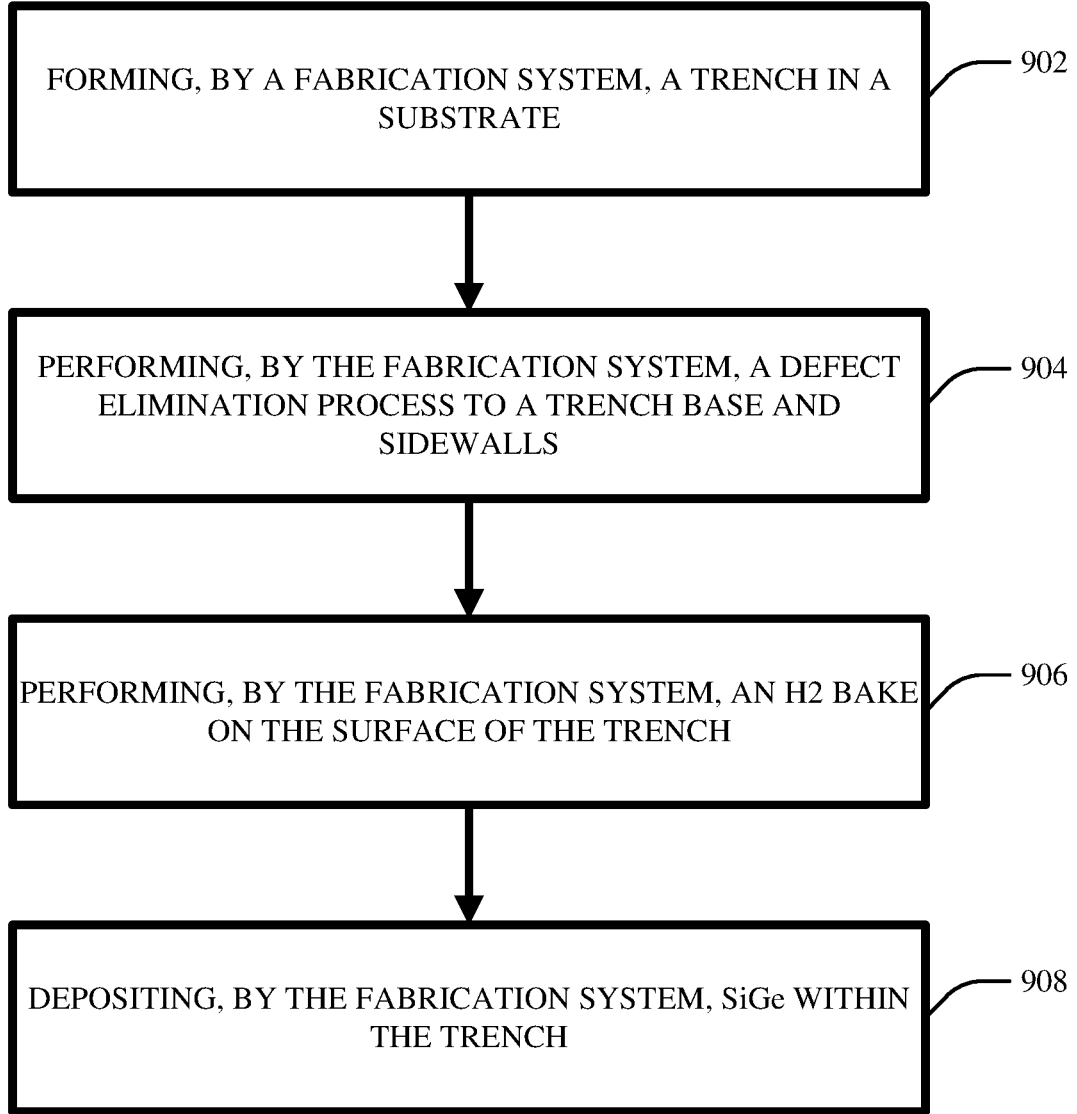
FIG. 9 illustrates a flow diagram of an example, non-limiting method of fabrication of embedded SiGe optical waveguides in accordance with one or more embodiments described herein.

FIG. 9 illustrates a flow diagram of an example, non-limiting method of fabrication 900 of embedded SiGe optical waveguides in accordance with one or more embodiments described herein.

At 902, method 900 can comprise, forming, by a fabrication system, a trench (e.g., trenches 122 and/or 124) in a substrate (e.g., substrate 102) For example, as described above in reference to FIG. 1, an etching process can be utilized to form trenches 122 and 124 within substrate 102. Theses trenches can then be utilized later as molds for embedded SiGe structures that act as waveguides.

At 904, method 900 can comprise performing, by the fabrication system, a defect elimination process to a trench (e.g., trenches 122 and 124) base and sidewalls. For example, as described above in reference to FIGS. 2 and 3, a defect elimination process can be utilized that consumes a small portion of the base and sidewalls of trenches 122 and 124. This process can thereby remove macroscopic defects within the trench, remove contaminants, and shape trenches 122 and 124 to allow formation of waveguides with optimized shapes. In some embodiments, the defect elimination process can comprise a second etching process (such as a wet etching process) can be utilized to consume or remove a small portion of the sidewalls and bases of trenches 122 and 124 which removes defects and flushes contaminants from trenches 122 and 124. In some embodiments, the defect elimination process can comprise a thermal oxidation process that extends a thin layer of oxide layer 104 onto the sidewalls and bases of trenches 122 and 124. This thin layer of oxide can then be stripped from trenches 122 and 124, thereby removing defects and optimizing the shape of trenches 122 and 124 for formation of SiGe. It should be appreciated that in one or more embodiments, the defect elimination process can comprise both the second etching process described above in relation to FIG. 2 and the thermal oxidation and strip process described in FIG. 3.

At 906, method 900 can comprise performing, by the fabrication system, a hydrogen bake on the surface of the trench (e.g., trenches 122 and/or 124). For example, as described herein in reference to FIG. 4, trenches 122 and 124 can be subjected to a hydrogen bake (e.g., an H2 bake). The H2 bake can comprise a temperature of at least 800° C., at a pressure of between 7 Torr and 50 Torr, for a period of between 1 and 10 minutes. This H2 bake removes any oxygen and moisture that may be embedded on the surface of the side walls and bases of trenches 122 and 124. Further, the bake can cause a reconfiguration the trench sidewalls and bases at a microscopic level that can eliminate defects on a scale of less than 10 μm, further optimizing the trenches for growth of SiGe.

At 908, method 900 can comprise depositing, by the fabrication system, SiGe (e.g., SiGe structures 422 and 424) within the trench (e.g., trenches 122 and 124). For example, as described above in detail in reference to FIG. 4, once the H2 bake is completed, SiGe structures 422 and 424 can be grown within defect free trenches 122 and 124. In one or more embodiments, the deposition of SiGe can comprise the use of Dichlorosilane gas ($H_2SiCl_2$), Germanium gas, Silane gas, Hydrogen Chloride gas (HCl) and/or a Hydrogen carrier gas, and a temperature of between 600 and 900° C. In some embodiments, SiGe structures 422 and 424 can be at least the critical thickness of SiGe and the SiGe structures can be fully strained. In some embodiments, the SiGe structure can further comprise an amount of carbon by including Monomethylsilane gas ($CH_3SiH_3$) during growth. In some embodiments, an epitaxial Si capping layer can be grown on the SiGe layer to help prevent the formation of strain-relieving dislocations in the SiGe layer. The thickness of this Si capping layer is less than 200 nm. This optional Si capping layer also provides a less chemically reactive surface during subsequent processing.

FIG. 10 illustrates a flow diagram of an example, non-limiting method of fabrication 1000 of embedded SiGe optical waveguides in accordance with one or more embodiments described herein.

At 1002, method 1000 can comprise etching, by a fabrication system, a trench (e.g., trenches 122 and/or 124) in a substrate (e.g., substrate 102) For example, as described above in reference to FIG. 1-8, theses trenches can then be utilized latter as molds for embedded SiGe structures that act as waveguides.

At 1004, method 1200 can comprise performing by the fabrication system, a defect elimination process to a trench (e.g., trenches 122 and 124) base and sidewalls. For example, as described above in reference to FIGS. 2 and 3, a defect elimination process can be utilized that consumes a small portion of the base and sidewalls of trenches 122 and 124. This process can thereby remove macroscopic defects within the trench, remove contaminants, and shape trenches 122 and 124 to allow formation of waveguides with optimized shapes. In some embodiments, the defect elimination process can comprise a second etching process (e.g., such as a wet etching process) can be utilized to consume or remove a small portion of the sidewalls and bases of trenches 122 and 124 which removes defects and flushes contaminants from trenches 122 and 124. In some embodiments, the defect elimination process can comprise a thermal oxidation process that extends a thin layer of oxide layer 104 onto the sidewalls and bases of trenches 122 and 124. This thin layer of oxide can then be stripped from trenches 122 and 124, thereby removing defects and optimizing the shape of trenches 122 and 124 for formation of SiGe. It should be appreciated that in one or more embodiments, the defect elimination process can comprise both the second etching process described above in relation to FIG. 2 and the thermal oxidation and strip process described in FIG. 3.

At 1006, method 1000 can comprise performing, by the fabrication system, a hydrogen bake on the surface of the trench (e.g., trenches 122 and/or 124). For example, as described herein in reference to FIG. 4, trenches 122 and 124 can be subjected to a hydrogen bake (e.g., an H2 bake). The H2 bake can comprise a temperature of at least 800° C., at a pressure of between 7 Torr and 50 Torr, for a period of between 1 and 10 minutes. This H2 bake removes any oxygen and moisture that may be embedded on the surface of the side walls and bases of trenches 122 and 124. Further, the bake can cause a realignment the trench sidewalls and bases at a microscopic level that can eliminate defects on a scale of less than 10 μm, further optimizing the trenches for growth of SiGe.

At 1008, method 1000 can comprise depositing, by the fabrication system, SiGe (e.g., SiGe structures 422 and 424) within the trench (e.g., trenches 122 and 124). For example, as described above in detail in reference to FIG. 4, once the H2 bake is completed, SiGe structures 422 and 424 can be grown within defect free trenches 122 and 124. In one or more embodiments, the deposition of SiGe can comprise the use of Dichlorosilane gas ($H_2SiCl_2$), Germanium gas, Silane gas, Hydrogen Chloride gas (HCl) an/or a Hydrogen carrier gas, and a temperature of between 600 and 900° C. In some embodiments, SiGe structures 422 and 424 can be at least the critical thickness of SiGe and the SiGe structures can be fully strained. In some embodiments, the SiGe structure can further comprise an amount of carbon by including Monomethylsilane gas ($CH_3SiH_3$) during growth. In some embodiments, an epitaxial Si capping layer can be grown on the SiGe layer to help prevent the formation of strain-relieving dislocations in the SiGe layer. The thickness of this Si capping layer is less than 200 nm. This optional Si capping layer also provides a less chemically reactive surface during subsequent processing.

At 1010, method 1000 can comprise planarizing, by the fabrication system, a surface of the SiGe structure (e.g., SiGe structures 422 and 424) and a surface of the substrate (e.g., substrate 102). For example, as described above in reference to FIG. 7, a planarization or polishing process can be utilized to improve the optical properties of the top of SiGe structures 422 and 424. For example, as shown, the tops of substrate 102 and SiGe structures 422 and 424 have been polished to be leveled with one and other.

At 1012, method 1000 can comprise depositing, by the fabrication system, a Si cladding layer on to the surface of the substrate. For example, a thick cladding layer of Si can be grown to extend the planarized substrate 102 overtop of SiGe structures 422 and 424. This Si cladding layer readies the SiGe waveguide and provides confinement of the optical modes in the buried SiGe regions. Furthermore, due to SiGe structures 422 and 424 already being embedded within substrate 102, the thick Si cladding layer is grown on a two-dimensional crystalline surface, thereby preventing the formation of stacking fault defects associated with 3D crystal growth. Additionally, because high crystalline quality 2D Si growth can optionally be performed at lower temperatures using silane gas ($SiH_4$) compared to 3D growth using Dichlorosilane ($H_2SiCl_2$), strain relaxation of the SiGe regions can be minimized. The growth of the thick Si cladding layer is typically grown at a temperature between 600° C. and 850° C. to a Si thickness between 3 and 10 microns. As completed, device 100 comprises the substrate 102, the fully strained SiGe structures 422 and 424, wherein the bottom surfaces of the SiGe structures 422 and 424 are in contact with the base surfaces and sidewalls of trenches 122 and 124.

Fabrication of the various embodiments of the subject disclosure described herein and/or illustrated in the figures (e.g., device 100) can comprise multi-step sequences of, for example, photolithographic and/or chemical processing steps that facilitate gradual creation of electronic-based systems, and/or optical waveguides. For instance, the various embodiments of the subject disclosure described herein and/or illustrated in the figures (e.g., device 100) can be fabricated on a substrate (e.g., a silicon (Si) substrate, etc.) by employing techniques including, but not limited to: photolithography, microlithography, nanolithography, nanoimprint lithography, photomasking techniques, patterning techniques, photoresist techniques (e.g., positive-tone photoresist, negative-tone photoresist, hybrid-tone photoresist, etc.), etching techniques (e.g., reactive ion etching (RIE), dry etching, wet etching, ion beam etching, plasma etching, laser ablation, etc.), evaporation techniques, sputtering techniques, plasma ashing techniques, thermal treatments (e.g., rapid thermal anneal, furnace anneals, thermal oxidation, etc.), chemical vapor deposition (CVD), atomic layer deposition (ALD), physical vapor deposition (PVD), molecular beam epitaxy (MBE), electrochemical deposition (ECD), chemical-mechanical planarization (CMP), backgrinding techniques, and/or another technique for fabricating an integrated circuit.

The various embodiments of the subject disclosure described herein and/or illustrated in the figures (e.g., device 100 can be fabricated using various materials. For example, the various embodiments of the subject disclosure described herein and/or illustrated in the figures (e.g., device 100 can be fabricated using materials of one or more different material classes including, but not limited to: crystalline materials, refractive materials, conductive materials, semiconducting materials, superconducting materials, dielectric materials, polymer materials, organic materials, inorganic materials, non-conductive materials, and/or another material that can be utilized with one or more of the techniques described above for fabricating an optical waveguide.

An advantage of the devices and methods of fabrication described herein is that they enable production of embedded optical waveguides with improved performance. For example, by enabling eliminating defects within a trench within a substrate, the trench can be utilized to form a SiGe waveguide structure with low defectivity and sidewalls that have a controlled profile based on desired optical properties.

A practical application of the devices described herein is that they allow for improve performance when compared to other waveguides, as well as ease of manufacture that avoids issues (e.g., high defectivity, SiGe strain loss and dislocations) associated with other devices and/or methods of fabrication.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A device comprising:
   a substrate comprising a trench within the substrate, wherein the trench comprises a base surface and sidewalls comprising the substrate; and
   a fully strained silicon-germanium (SiGe) optical waveguide structure located within the trench, wherein a bottom surface of the SiGe structure is in contact with the base surface, wherein side surfaces of the SiGe structure are in contact with the sidewalls, and wherein the SiGe structure is at least twice the critical thickness, and wherein a top surface of the SiGe optical waveguide structure is flush with a top surface of the substrate.

2. The device of claim 1, further comprising a capping layer that covers a top surface of the SiGe structure.

3. The device of claim 2, wherein the capping layer comprises the same material as the substrate.

4. The device of claim 1, wherein the sidewalls and the base surface are defect free.

5. The device of claim 4, wherein an etch process is utilized to remove defects from the sidewalls and the base surface.

6. The device of claim 5, wherein the etch process comprises a wet etch.

7. The device of claim 5, wherein the etch process comprises a dry etch.

8. The device of claim 4, wherein a thermal oxidation and strip process is utilized to remove defects from the sidewalls and the base surface.

9. The device of claim 1, wherein a top surface of the SiGe structure and a top surface of the substrate are planarized.

10. The device of claim 1, wherein the SiGe structure further comprises carbon.

11. A method of fabrication comprising:
   forming, by a fabrication system, a trench in a substrate;

performing, by the fabrication system, a defect elimination process to a base surface and sidewalls of the trench;
   performing, by the fabrication system, an H2 bake on the base surface and the sidewalls of the trench; and
   depositing, by the fabrication system, an SiGe optical waveguide structure within the trench.

12. The method of claim 11, wherein the defect elimination process comprises optimization of the sidewalls of the trench.

13. The method of claim 11, further comprising stripping, by the fabrication system, an oxide layer from a top surface of the substrate.

14. The method of claim 13, further comprising depositing, by the fabrication system, a cap onto a surface of the substrate.

15. The method of claim 14, wherein the depositing the cap comprises planarizing the surface of the substrate and growing the cap on the planarized surface.

16. The method of claim 11, wherein the forming the trench comprises etching the trench into the substrate.

17. The method of claim 11, wherein the defect elimination process comprises an etching of the base surface and the sidewalls of the trench.

18. The method of claim 17 wherein the etching comprises at least one of a dry etch or wet etch.

19. The method of claim 11, wherein the defect elimination process comprises a thermal oxidation and strip process.

20. A method of fabrication comprising:
   etching, by a fabrication system, a trench in a substrate;
   performing, by the fabrication system, a defect elimination process to a base surface and sidewalls of the trench, wherein the defect elimination process comprises a wet etching of the trench and a thermal oxidation and strip process;
   performing, by the fabrication system, an H2 bake on the base surface and the sidewalls of the trench;
   depositing, by the fabrication system, an SiGe optical waveguide structure within the trench;
   planarizing, by the fabrication system, a surface of the SiGe optical waveguide structure and a surface of the substrate; and
   depositing, by the fabrication system, a cap onto the surface of the substrate.

* * * * *